United States Patent [19]

Long, Jr. et al.

[11] 3,786,734
[45] Jan. 22, 1974

[54] UNDERWATER ELECTRONIC FLASH ACTUATOR

[76] Inventors: Martin H. Long, Jr., 61 Camino Alto; Alvin L. Pachynski, 423 Pixie Trl., both of Mill Valley, Calif. 94941

[22] Filed: Oct. 27, 1972

[21] Appl. No.: 301,547

[52] U.S. Cl. ............................. 95/11 W, 95/11.5 R
[51] Int. Cl. ...................... G03b 15/05, G03b 17/08
[58] Field of Search ............. 95/11 W, 11 R, 11.5 R

[56] References Cited
UNITED STATES PATENTS
2,996,966  8/1961  Edgerton...................... 95/11 W X

*Primary Examiner*—Robert P. Greiner
*Attorney, Agent, or Firm*—Townsend and Townsend

[57] ABSTRACT

An underwater electronic flash actuator for electronic flash apparatus contained in a waterproof housing separate from the camera and interconnected thereto by an electrical cable, in which the deleterious effects of salt water on the cable conductors are substantially eliminated. A battery is provided in the camera housing connected in series with the camera shutter switch. An electronic gating circuit, typically employing a silicon control rectifier, is provided in the electronic flash housing. The circuitry is interconnected by a pair of conductors between the camera and electronic flash housings so that the actuation of the shutter switch applies current from the battery to the gating circuitry to trigger the electronic flash.

12 Claims, 3 Drawing Figures

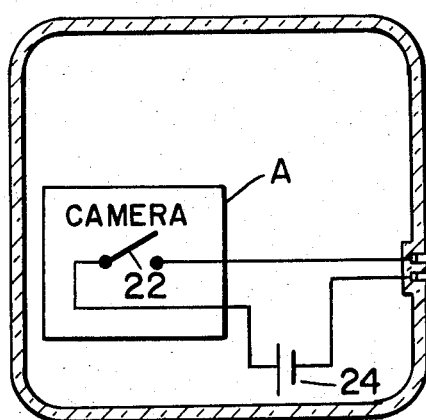
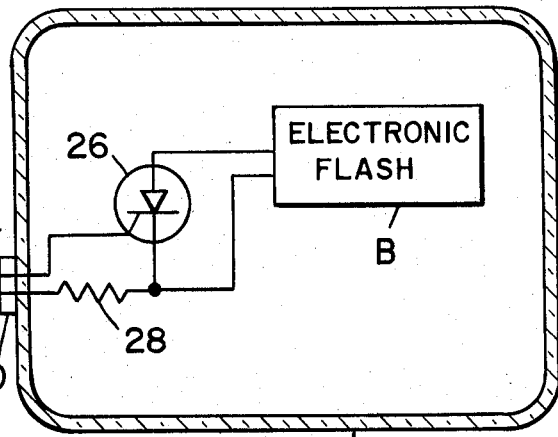
FIG_1
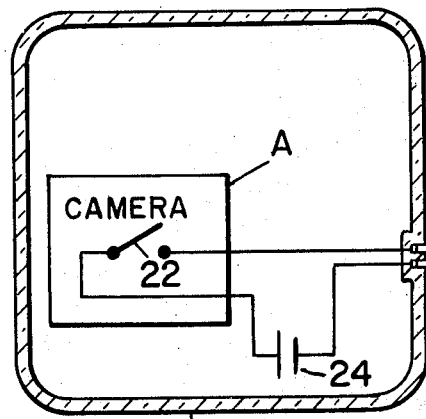
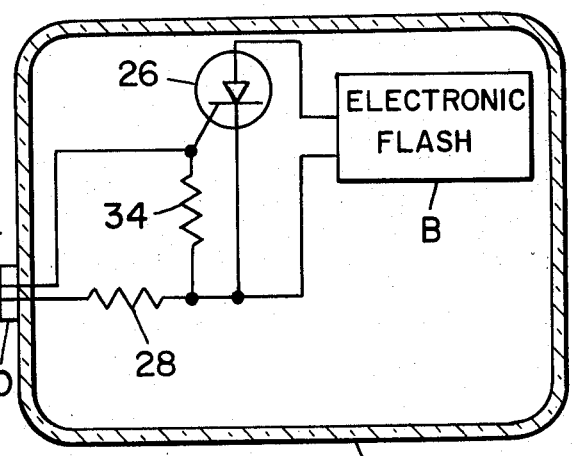
FIG_2
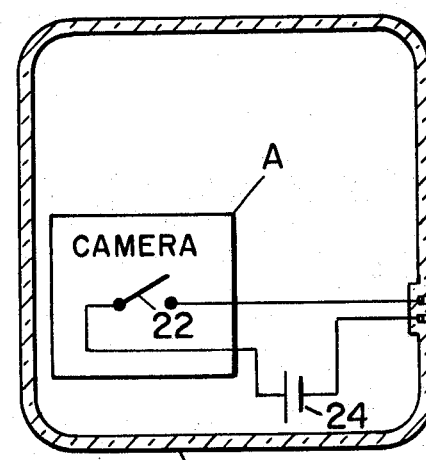
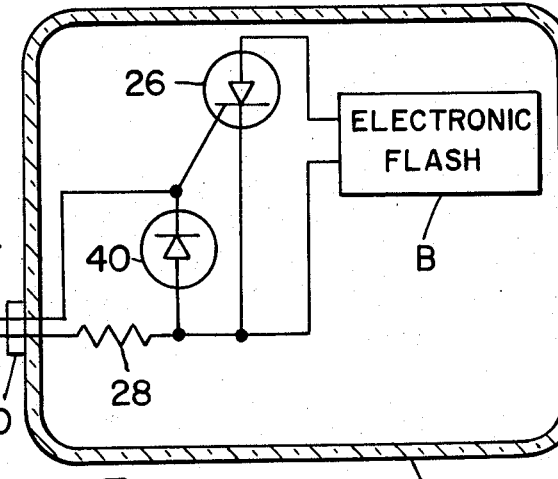
FIG_3

UNDERWATER ELECTRONIC FLASH ACTUATOR

This invention relates to underwater still photography, and more particularly, to an underwater electronic flash actuator.

In underwater still photography, it is often necessary to employ artificial lighting in the form of flash apparatus. The use of conventional flash bulbs is impractical as the necessary underwater housing makes the task of changing flashbulbs after each photograph extremely difficult. It is thus advantageous to employ electronic flash apparatus in underwater applications.

Typically, underwater electronic flash apparatus is contained in a waterproof housing separate from the camera. Electrical interconnection between the electronic flash and the camera is accomplished by an electrical cable, issuing from a waterproof gland in the electronic flash housing, having a waterproof connector adapted to mate with a complementary connector on the camera housing. Obviously, the gland and connector must be waterproof to prevent water from entering the interior of the electronic flash or camera housings. Moreover, should salt water reach the conductors, either at the gland, the connector, or the cable itself, the electronic flash may be rendered inoperative. Specifically, the salt water on the conductors will introduce a resistance across the terminals of the electronic flash which will slowly discharge the charge contained therein while preventing it from recharging. Heretofore, this problem has been minimized by the use of heavily waterproofed glands, cables and connectors, which are expensive, cumbersome, unreliable and thus undesirable.

According to the present invention, an underwater electronic flash actuator is provided in which the deleterious effects of salt water leakage on the conductors is minimized. Specifically, a battery is provided in the camera housing connected in series with the camera shutter switch. Electronic gating circuitry is provided in the electronic flash housing connected to the input terminals of the electronic flash. The circuitry thus provided in the camera and electronic flash housings is interconnected by a pair of conductors, so that actuation of the camera shutter switch will apply the battery voltage to the gating circuitry to energize the electronic flash. The gating circuitry may typically comprise a silicon control rectifier or SCR with the anode and cathode thereof connected to the input terminals of the electronic flash. The series circuit formed by the shutter switch and battery is connected to the gate and cathode of the SCR via a current limiting resistor. When the camera shutter switch is actuated, current from the battery will be applied to the gate of the SCR, causing it to conduct from anode to cathode to actuate the electronic flash.

The underwater electronic flash actuator according to the present invention is particularly advantageous in that salt water leakage to the conductors interconnecting the camera and electronic flash housings will not interfere with the operation of the electronic flash, and will otherwise produce no deleterious effects. Thus, the electrical cable, gland and connector may be of a simple and inexpensive construction. The reliability of the underwater photographic apparatus is thus increased while simultaneously reducing the cost and complexity thereof.

It is thus an object of the present invention to provide an underwater electronic flash actuator in which the degree of waterproofing necessary for the electrical interconnections of the camera and the electronic flash is minimized.

Another object of the present invention is to provide an underwater electronic flash actuator employing a battery in the camera housing connected in series with the shutter switch and connected to gating circuitry contained in the electronic flash housing.

Yet another object of the present invention is to provide an underwater electronic flash actuator employing a silicon control rectifier as a gating circuit for actuation of the electronic flash.

These and other objects, features and advantages of the present invention will be more readily apparent from the following detailed description, wherein reference is made to the accompanying drawings, in which:

FIG. 1 is a diagramatic view, partially in schematic form, of a preferred embodiment of the underwater electronic flash actuator according to the present invention;

FIG. 2 is a diagramatic view, similar to FIG. 1, of an alternative embodiment of the underwater electronic flash actuator according to the present invention; and FIG. 3 is a diagramatic view, similar to FIG. 1, of still another alternative embodiment of the underwater electronic flash actuator according to the present invention.

Referring initially to FIG. 1, there is provided a still camera A, contained in a conventional underwater housing 10 and an electronic flash B contained in a conventional underwater housing 12. Housings 10 and 12 are interconnected by an electrical cable having a pair of conductors 14 and 16. Conductors 14 and 16 issue from housing 12 through a waterproof gland 20 and terminate at housing 10 in a polarized waterproof connector 18. It is essential that connector 18 and gland 20 be waterproof to the extent that they effectively prevent water from entering the interior of housings 10 and 12, to eliminate the possibility of damage to the camera A or electronic flash B. As will be more readily apparent hereinafter, it is not essential that connector 18 and gland 20 prevent water from contacting conductors 14 and/or 16.

The degree of waterproofing thus required may be obtained through the use of a conventional connector 18 and gland 20 typically employed with underwater flashbulb-type photoflash apparatus. Conductors 14 and 16 may comprise any simple two-conductor insulated electrical wire, such as lamp cord, telephone-type wire or the like.

Camera A conventionally includes a normally open shutter switch 22 which momentarily contacts upon the actuation of the shutter mechanism. In accordance with the present invention, a battery 24 is disposed within housing 10 and is connected in series with shutter switch 22. Battery 24 may typically comprise a single-cell dry battery of the 1½ volt variety. While a flashlight-type battery may be employed, space limitations within existing camera housings may dictate the use of a smaller battery 24, such as a PX 825 alkaline battery typically employed in cameras. As will be more readily apparent hereinafter, the precise battery 24 employed is of little consequence to the present invention.

The series circuit thus formed by shutter switch 22 and battery 24 is connected, via connector 18, to conductors 14 and 16. While the placement of shutter switch 22 and battery 24 in the series circuit is of no import, it is essential that the appropriate battery polarities be applied to conductors 14 and 16 to actuate the gating circuitry associated with the electronic flash B. Specifically, the positive polarity terminal of battery 24 is directed to conductor 14 and the negative polarity terminal of battery 24 is directed to conductor 16. To insure the correct polarities, connector 18 is preferably of the polarized type, as referred to hereinbefore, so that the connector 18 will mate only with the conductors 14 and 16 appropriately connected.

As briefly referred to hereinbefore, suitable gating circuitry is disposed within housing 12 in accordance with the present invention. Conventionally, electronic flash B includes two input terminals. In order to actuate electronic flash B, a conductive path must be provided between these two input terminals. Thus, the gating circuitry contained within housing 12 is adapted to provide a conductive path between the input terminals of electronic flash B in response to the signal on leads 14 and 16 produced by battery 24 upon the momentary closure of shutter switch 22.

In accordance with a preferred embodiment of the present invention, depicted in FIG. 1, such gating circuitry may simply comprise a silicon control rectifier or SCR 26 and a resistor 28. The anode and cathode of SCR 26 are respectively connected to the input terminals of electronic flash B. Conductor 14 is connected to the gate of SCR 26. Conductor 16 is connected to the cathode of SCR 26 via resistor 28. SCR 26, of course, does not conduct between anode and cathode unless current is supplied to the gate thereof. Since shutter switch 22 is normally open, no signal is normally applied to the gate of SCR 26. Thus, SCR 26 will normally be non-conductive so that the input terminals of electronic flash B are effectively open circuited.

When a photograph is taken, shutter switch 22 momentarily closes, completing a series circuit from the cathode of SCR 26 through resistor 28, battery 24 and shutter switch 22 to the gate of SCR 26. Current from battery 24 will thus be supplied to the gate of SCR 26 causing it to momentarily conduct. A conductive path will thus momentarily appear at the input terminals of electronic flash B, causing it to flash in the conventional manner. It is noteworthy that resistor 28 functions to limit the current through the gate of SCR 26 and the shutter switch 22. The possibility of damage to these components due to unduly high currents therethrough is thus eliminated.

Camera A and electronic flash B thus operate in the conventional manner. However, the deleterious effects of salt water leakage onto conductors 14 and 16 are substantially eliminated. Specifically, leakage of salt water onto conductors 14 and 16 will produce a leakage resistance or current path therebetween. It is apparent, however, that such a leakage resistance or current path will not effect the operation of the circuitry thus described. Specifically, in the steady state, conductors 14 and 16 are isolated from both battery 24 and electronic flash B by the open shutter switch 22 and the non-conducting SCR 26, respectively. Thus, in the steady state, a leakage resistance or current path between conductors 14 and 16 will not discharge battery 24, influence electronic flash B or otherwise affect the circuitry.

When a photograph is taken, and the shutter switch 22 is momentarily closed, the leakage resistance or current path will momentarily conduct current from battery 24. However, SCR 26 will still be satisfactorily actuated, as the gate current level necessary to cause conduction of SCR 26 is minimal, and sufficient current will still be present notwithstanding the additional load of the leakage resistance or current path. Thus, the flash actuator circuitry will perform satisfactorily even though salt water may contact the conductors 14 and 16.

As referred to hereinbefore, conventional underwater electronic flash apparatus would be rendered inoperative by such salt water leakage. Thus, the underwater electronic flash actuator of the present invention is distinctly advantageous. A lesser degree of waterproofing is necessitated, thus enabling the use of less complex, costly and cumbersome connectors, conductors cables and glands.

Referring now to FIGS. 2 and 3, two alternative embodiments of the underwater electronic flash actuator according to the present invention will now be described. Specifically, there is provided a camera A contained within a waterproof housing 10 and an electronic flash B contained within a waterproof housing 12. Camera A, electronic flash B and housings 10 and 12 are substantially identical to those described with respect to the embodiment depicted in FIG. 1. Thus, camera A includes a normally open shutter switch 22.

As described hereinbefore, a battery 24 is provided in series with shutter switch 22, and the series circuit thus formed is connected to electronic flash gating circuitry via conductors 14 and 16. Specifically, conductors 14 and 16 issue from a gland 20 in housing 12 and terminate at a connector 18 in housing 10, substantially as described hereinbefore.

The gating circuit contained within housing 12 includes an SCR 26 having the anode and cathode thereof connected to the input terminals of electronic flash B. Lead 14 is connected to the gate of SCR 26 and lead 16 is connected to the cathode of SCR 26 via a current limiting resistor 28.

To this point, the apparatus depicted in FIGS. 2 and 3 is substantially identical to the embodiment described with respect to FIG. 1. However, applicant has found that with certain SCRs 26, connection of the anode and cathode thereof to the input terminals of electronic flash B will result in an undesired firing of the electronic flash. Specifically, the use of very sensitive SCRs, that is SCRs having low gate currents, may produce this problem. Firing of electronic flash B upon connection to the circuitry is obviously undesirable.

Applicants have conceived of two alternative solutions to this problem, depicted in FIGS. 2 and 3, respectively. With specific reference to the embodiment depicted in FIG. 2, a resistor 34 is provided connecting the gate and cathode of SCR 26. Resistor 34 functions to supress any pulses induced in the gate of SCR 26 upon connection to electronic flash B, thereby maintaining SCR 26 in its nonconducting state until actuation of the camera shutter switch 22. Undesired firing of the electronic flash B at the time of connection to SCR 26 is thus eliminated. Resistor 34 will draw some current from battery 24 when shutter switch 22 is momentarily closed. However, the short time duration of the contact closure of shutter switch 22 renders such additional current insignificant. In other respects, the operation of the circuitry depicted in FIG. 2 is sustantially identical to that described with respect to the embodiment depicted in FIG. 1.

An alternative solution of the problem of electronic flash triggering at the time of initial connection to SCR 26 is depicted in the embodiment of FIG. 3. Specifically, a diode 40 is connected between the gate and cathode of SCR 26. Diode 40 functions to couple the gate of SCR 26 to the cathode thereof until shutter switch 22 closes. It is noteworthy that diode 40 is connected in reverse bias configuration with respect to battery 24, so that current flow therethrough will be negligible. Accordingly, the problem of electronic flash flashing upon connection to SCR 26 is thus solved with no appreciable affect upon the operation of the circuitry heretofore described.

While particular embodiments of the present invention have been shown and described in detail, it is apparent that adaptations and modifications will occur to those skilled in the art, which adaptations and modifications are specifically within the spirit and scope of the present invention, as set forth in the claims.

What is claimed is:

1. An underwater flash actuator for a still camera and electronic flash housed in separate waterproof housings comprising a battery disposed in said camera housing connected in series with the shutter switch of said camera, gating circuit means contained in said electronic flash housing connected to the input of said electronic flash for triggering said electronic flash in response to an electrical signal and conductor means connecting said series circuit to said gating circuit means, said gating circuit means comprising a silicon controlled rectifier having conducting and nonconducting states with the anode and cathode thereof connected to the input terminals of said electronic flash.

2. Apparatus according to claim 1 wherein the gate and cathode of said silicon control rectifier are respectively connected to said conductor means.

3. Apparatus according to claim 1 further comprising current limiter means for limiting the current through said shutter switch.

4. Apparatus according to claim 1 wherein said current limiter means comprises a resistor connected between the cathode of said silicon control rectifier and said conductor means.

5. An underwater flash actuator for a still camera and electronic flash housed in separate waterproof housings comprising a battery disposed in said camera housing connected in series with the shutter switch of said camera, a silicon controlled rectifier having an anode, cathode and gate and disposed in said electronic flash housing, therefore, the anode and cathode thereof connected to the input terminals of said electronic flash and a pair of conductors connecting said series circuit to the gate and cathode of said silicon control rectifier.

6. Apparatus according to claim 5 wherein said electronic flash housing includes a waterproof gland and said camera housing includes an electrical connector, said pair of conductors issuing from said gland and a waterproof connector on the ends of said conductors and matable with the connector of said camera housing.

7. Apparatus according to claim 5 further comprising current limiter means for limiting the current through said shutter switch.

8. Apparatus according to claim 7 wherein said current limiter means comprises a resistor connected between the cathode of said silicon control rectifier and one of said conductors.

9. Apparatus according to claim 5 further comprising pulse suppressor means for suppressing pulses induced in the gate of said silicon control rectifier upon connection of the anode and cathode thereof to said input terminals.

10. Apparatus according to claim 9 wherein said pulse suppressor means comprises a resistor connected between the gate and cathode of said silicon control rectifier.

11. Apparatus according to claim 9 wherein said pulse suppressor means comprises a diode connected between the gate and cathode of said silicon control rectifier in reverse-bias configuration.

12. An underwater flash system comprising a first and second waterproof housing, a camera mounted in said first housing having an electrical power source connected in series with an electrical shutter switch of said camera and having a first pair of electrical terminals connected to the outside of said housing forming a series connection from one of said terminals through the shutter switch and said power source to the other terminal, said second housing having enclosed therein an electronic flash unit and a gating circuit, said gating circuit operable while being energized by said power source to be in a first condition of operation to flash said lamp and while not being energized by said power source to be in a second condition of operation to maintain said flash in an inoperative condition, second terminal means extending through said second housing and connecting said gating circuit and said first terminal means, whereby upon actuation of the shutter of the camera in said first housing power is transmitted to said gating circuit to cause said gating circuit to be in the first condition of operation and thereby cause said flash to actuate.

* * * * *